US008762420B2

(12) United States Patent
Brown et al.

(10) Patent No.: US 8,762,420 B2
(45) Date of Patent: Jun. 24, 2014

(54) AGGREGATION OF DATA STORED IN MULTIPLE DATA STORES

(75) Inventors: Kevin L. Brown, Redmond, WA (US); William R. Avery, Redmond, WA (US); Omer Atay, Redmond, WA (US); Mohammad Rashid, Redmond, WA (US); Todd J. Abel, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 941 days.

(21) Appl. No.: 12/142,836

(22) Filed: Jun. 20, 2008

(65) Prior Publication Data
US 2009/0319548 A1 Dec. 24, 2009

(51) Int. Cl.
*G06F 17/30* (2006.01)

(52) U.S. Cl.
USPC ........... 707/803; 707/790; 707/791; 707/792; 707/802

(58) Field of Classification Search
USPC ................................. 707/790–793, 802, 803
See application file for complete search history.

(56) References Cited

U.S. PATENT DOCUMENTS

| 6,061,689 | A | 5/2000 | Chang et al. |
| 6,925,476 | B1 | 8/2005 | Multer et al. |
| 7,007,041 | B2 | 2/2006 | Multer et al. |
| 2005/0055382 | A1 | 3/2005 | Ferrat et al. |
| 2005/0198085 | A1 | 9/2005 | Blakey et al. |
| 2005/0228812 | A1 | 10/2005 | Hansmann et al. |
| 2006/0015619 | A1 | 1/2006 | Tse et al. |
| 2006/0080363 | A1 | 4/2006 | Vadlamani et al. |
| 2006/0195460 | A1* | 8/2006 | Nori et al. ..................... 707/100 |
| 2006/0195476 | A1* | 8/2006 | Nori et al. ..................... 707/104.1 |
| 2006/0287890 | A1* | 12/2006 | Stead et al. ........................ 705/3 |
| 2006/0294151 | A1* | 12/2006 | Wong et al. ................... 707/200 |
| 2006/0294197 | A1* | 12/2006 | Mital et al. ..................... 709/217 |
| 2007/0067349 | A1 | 3/2007 | Jhaveri et al. |
| 2007/0067354 | A1 | 3/2007 | Mullender et al. |
| 2008/0028102 | A1 | 1/2008 | Peacock |

OTHER PUBLICATIONS

"SOA Challenges: Entity Aggregation" by Ramkumar Kothandaraman, Microsoft Corporation, May 2004.*
"Data Profiling, Data intergration and Data Quality : The Pillars of Master Data Management" by David Loshin , Copyright May 2007, Powell Media, LLC and David Loshin.*

(Continued)

*Primary Examiner* — Cindy Nguyen
(74) *Attorney, Agent, or Firm* — Steve Crocker; Jim Ross; Micky Minhas (57) ABSTRACT

A data aggregation system is described herein for accessing and viewing information about an entity stored in multiple data stores. The data aggregation system identifies an entry in a primary data store that contains information about an entity. The system receives a request to associate an entry in a secondary data store with the identified entry in the primary data store. Then, the system identifies information in the secondary data store that identifies the entry in the secondary data store and associates the identified information with the entry in the primary data store. When a user requests to view the entry in the primary data store, the system retrieves the information about the entry in the primary data store and uses the stored entry identifier to also retrieve the information about the entry from the secondary data store. Thus, the information remains in the data store in which it originated, but the data aggregation system provides a unified view.

20 Claims, 6 Drawing Sheets

(56) References Cited

OTHER PUBLICATIONS

"Extending Enterprise Applications with Microsoft Outlook: Architectural Design Guide", Jan. 2006, Microsoft Coporation.*
Milojicic, et al., "Appliance Aggregation Architecture (A3)", Date: May 25, 2003, pp. 1-11.

"Building Office Business Applications: A New Breed of Business Applications Built on the 2007 Microsoft Office System", Date: Jun. 2006, 12 pages, http://msdn2.microsoft.com/en-us/library/aa479072.aspx.

* cited by examiner

AGGREGATION OF DATA STORED IN MULTIPLE DATA STORES

BACKGROUND

Users of computer systems often store many types of information that relates to the same entity in various data stores. Each data store is typically well suited for storing a particular type of data and is often associated with an application that allows the user to view and manipulate the data. For example, a user may store information about people the user has met as contacts using Microsoft Outlook. The information often contains each contact's telephone number, street address, email address, and so forth. Other data stores, such as an employee database for a company, may contain information related to the same people. For example, the employee database may contain information about the date a person was hired, what office the person works in, the benefits that the company provides to the person, and so forth. The number of data stores increase as application developers find different uses for information about people or other entities (e.g., companies, offices, and so forth). A user today often uses many data stores with information about related entities, and the user often has to look in many different places (e.g., applications or data stores) to find all of the information related to a particular entity.

There are several common strategies for viewing information associated with a particular entity. The first strategy is to create custom applications for viewing the data in each data store. For example, a user may use Microsoft Outlook or another Personal Information Management (PIM) application to view contact information and use a separate application for viewing sales orders related to his/her business. Another strategy is to use the extensibility provided by an application to extend that application to view multiple types of data. For example, Microsoft Outlook provides an Application Programming Interface (API) for extending the user interface to view many different types of data. While this strategy allows the user to view related information in the same application, the user can still only view one type of information at a time. For example, the user typically would select a folder containing contact information and view that information, and then subsequently select a folder containing sales orders and separately view that information. This strategy does not allow the user to view all of the related data about an entity at the same time.

Another common strategy for viewing information associated with a particular entity is to copy all of the information about that entity from multiple data stores into one data store. A SQL JOIN clause is one way of combining information from two tables within a single data store. However, a JOIN does not work across separate data stores and copies the data into a single temporary table. The copying performed by a JOIN can be time consuming and often makes a JOIN one of the worst performing database operations. As another example, Microsoft Outlook allows applications to add custom fields for contacts that can be displayed with the contacts, and applications can copy information from another data store into Microsoft Outlook's data store as custom fields.

While this strategy allows all of the information to be viewed at the same time, it is not suitable for data that changes over time. This strategy leads to a new problem of keeping the data that is now stored in multiple data stores synchronized. For example, suppose the information from a sales record associated with a person is copied into the contact data store as custom fields associated with that person's contact information. When information about the person changes, both data stores need to be updated. For example, if the person changes his/her address a user may remember to update one data store but not the other. Keeping the two data stores synchronized can be a more difficult problem than the original problem of viewing related data about an entity at the same time. Another problem with this strategy is that the data types of the two data stores may not be the same, making it is difficult to determine into which data type to copy the information.

SUMMARY

A data aggregation system is described herein for accessing and viewing information about an entity stored in multiple data stores. The data aggregation system identifies an entry in a primary data store that contains information about an entity. Next, the data aggregation system receives a request to associate an entry in a secondary data store with the identified entry in the primary data store. Then, the data aggregation system identifies information in the secondary data store that identifies the entry in the secondary data store and associates the identified information with the entry in the primary data store, so that the entries from the primary and secondary data store can be viewed together without modifying the secondary data store. When a user requests to view the entry in the primary data store, the data aggregation system retrieves the information about the entry in the primary data store and uses the stored entry identifier to also retrieve the information about the entry from the secondary data store. Thus, the information remains in the data store in which it originated (avoiding the need for synchronization), but the data aggregation system provides a unified view so that applications can access the information as if it were stored in one place.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A data aggregation system is described herein for accessing and viewing information about an entity stored in multiple data stores. The data aggregation system identifies an entry in a primary data store that contains information about an entity. For example, a user may select a contact in his/her contact database with which the user wants to associate additional information stored in another data store. The data aggregation system receives a request to associate an entry in a secondary data store with the identified entry in the primary data store. For example, the user may provide information that identifies the location of line of business data related to the user's contacts. The data aggregation system identifies information in the secondary data store that identifies the entry in the secondary data store. For example, the secondary data store may contain an entry identifier for each entry or the data aggregation system may choose other identifying information such as a person's social security number or first name and last name to identify each entry.

The data aggregation system associates the identified information with the entry in the primary data store, so that the entries from the primary and secondary data store can be viewed together without modifying the secondary data store. For example, the system may store the entry identifier from the secondary data store in a field in the primary data store. When a user requests to view the entry in the primary data store, the data aggregation system retrieves the information about the entry in the primary data store and uses the stored entry identifier to also retrieve the information about the entry from the secondary data store. Thus, the information remains in the data store in which it originated (avoiding the need for synchronization), but the data aggregation system provides a unified view so that applications can access the information as if it were stored in one place. The data aggregation system uses memory for aggregating the information that would already be used by other solutions (e.g., SQL JOINs or copying all of the data into one data store). For example, a solution that copies all of the data to the primary data store uses the amount of space that is adequate to hold all of the data. By doing the aggregation at load-time the data aggregation system uses a similar amount of space without many of the disadvantages (e.g., data synchronization).

Figure 1:
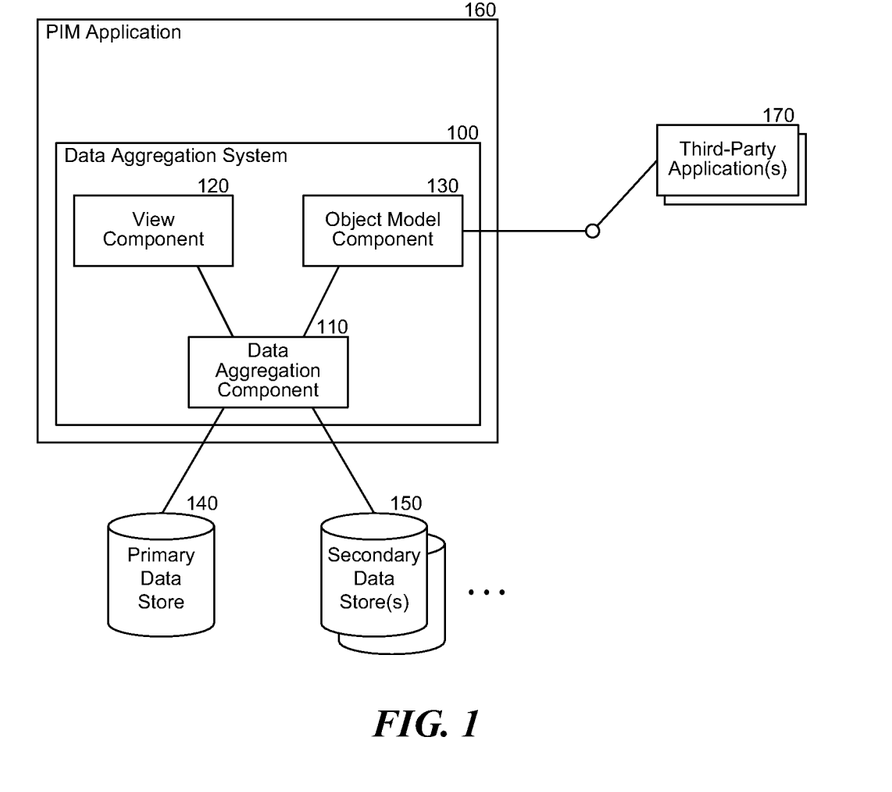
FIG. 1 is a block diagram that illustrates the operating environment of the data aggregation system, in one embodiment.

FIG. 1 is a block diagram that illustrates an operating environment of the data aggregation system, in one embodiment. The data aggregation system 100 comprises a data aggregation component 110, a view component 120, and an object model component 130. The data aggregation system 100 accesses data from a primary data store 140 and one or more secondary data stores 150. The data aggregation system 100 may be implemented within a PIM application 160 (as shown) or may be a separate module accessed by the PIM or other applications. The data aggregation system 100 may also be accessed by one or more third-party applications 170. The system 100 may include a sorting component (not shown) for sorting data from multiple data stores. These components are described in further detail below.

The primary data store 140 contains rows of data that contain fields (or columns) of information. Each row represents a collection of the information stored in the primary data store about a particular entity. For example, if the primary data store 140 contains contact information, then each row represents a particular contact and each column represents a field of information about that contact. As an example, the primary data store 140 may be a database of contacts for a PIM application and contain fields for the contact's first name, last name, street address, telephone number, email address, and other contact information. The primary data store 140 may be stored as a local data file (e.g., a Microsoft Outlook PST file) or may be provided by a server (e.g., Microsoft Exchange Server). The primary data store 140 may contain an entry identifier that differentiates entries in the primary data store 140. Similarly, the primary data store may contain references to one or more secondary data stores that identify entries in the secondary data stores related to the entries in the primary data store.

The secondary data store 150 (or additional related data stores) contains additional information about various entities. The secondary data store 150 may contain line of business data related to a particular type of transaction or business need. For example, the secondary data store 150 may contain sales leads of a salesperson or insurance customers of an insurance agent. The secondary data store 150 may contain additional information for an entity that is not available in the primary data store 140, such as the last date a sales lead was contacted or the types of insurance in which an insurance customer is interested. The secondary data store 150 may also contain information that duplicates the information in the primary data store 140, such as a person's first and last name (called shared fields). The data aggregation system 100 may use such duplicate information to determine that an entry in the primary data store 140 and an entry in the secondary data store 150 relate to the same entity.

The data in the primary data store 140 and secondary data store(s) 150 may be stored in a variety of formats and may be accessed according to many protocols. For example, a PIM application may store data using the Messaging Application Programming Interface (MAPI), whereas a line of business application may store data using Structure Query Language (SQL). Those of ordinary skill in the art will recognize the many available formats and protocols according to which the data may be stored and accessed.

The data aggregation component 110 associates entries in the primary data store 140 with entries in the secondary data store 150, and provides a unified view of information about each entity from each data store. The data aggregation component 110 keeps the data store in which particular information is stored transparent to consumers of the information. The information may be consumed by an application designed for viewing information about a particular type of entity or may be exposed through an API accessible by third-party applications 170. The third party applications 170 may provide additional views or processing of the information. For example, a backup application could access the API provided by the data aggregation component 110 to create a redundant copy of all of the information associated with a particular entity, without having to separately identify and access multiple data stores that contain information about the entity.

In some embodiments, the data aggregation component 110 operates at a low level so that layers above the data aggregation component 110 do not perform special steps to access information about an entity, regardless of where the information is stored. The data aggregation component 110 aggregates all of the information about an entity into a single row of data by adding fields to the row from each of the available data stores containing information about the entity. In this way, an application that previously could consume information from a single data store can be used to consume additional information from other data stores using the data aggregation system without modifying the application.

The view component 120 accesses the data aggregation component 110 to provide a unified view of the aggregated information. For example, the view component 120 may display each entity as a row in a table and each field of information as a column in the table. The view component 120 does not necessarily know which data store each field of information came from, because the data aggregation component 110 handles accessing the appropriate data store to retrieve the available information for each entity. The view component 120 may provide a read-only view, or may allow the user to edit the data in place, such as by selecting a particular row and column. The view component 120 provides the user's edits to the data aggregation component 110 to update the data store from which the edited fields originated.

The object model component 130 provides a unified view of the aggregated information programmatically, such as to third-party applications 170. Like the view component 120, the object model component 130 accesses the data aggregation component 110 to obtain information from multiple data stores transparently to the calling application. The object model component 130 may provide the information as part of a larger API exposed by an application. For example, Microsoft Outlook exposes an object model with various APIs through which an application can access much of the same functionality available through the Microsoft Outlook user interface.

The following example code illustrates how the Microsoft Outlook Object Model is used to retrieve custom properties stored for a contact. The UserProperties method can be extended internally to return fields from one or more secondary data stores 150 described above without the calling application being aware of where the data originates.

```
Sub FindContact( )
    'Finds and displays last contacted info for a contact
    Dim objContact As Outlook.ContactItem
    Dim objContacts As Outlook.Folder
    Dim objNameSpace As Outlook.NameSpace
    Dim objProperty As Outlook.UserProperty
    Set objNameSpace = Application.GetNamespace("MAPI")
    Set objContacts =
objNameSpace.GetDefaultFolder(olFolderContacts)
    Set objContact = objContacts.Items.Find( _
        "[FileAs] = ""Smith, Jeff""" and [FirstName] = """Jeff""")
    If Not TypeName(objContact) = "Nothing" Then
        Set objProperty = _
            objContact.UserProperties.Find("LastDateContacted")
        If TypeName(objProperty) <> "Nothing" Then
            MsgBox "Last Date Contacted: " & objProperty.Value
        End If
    Else
        MsgBox "The contact was not found."
    End If
End Sub
```

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
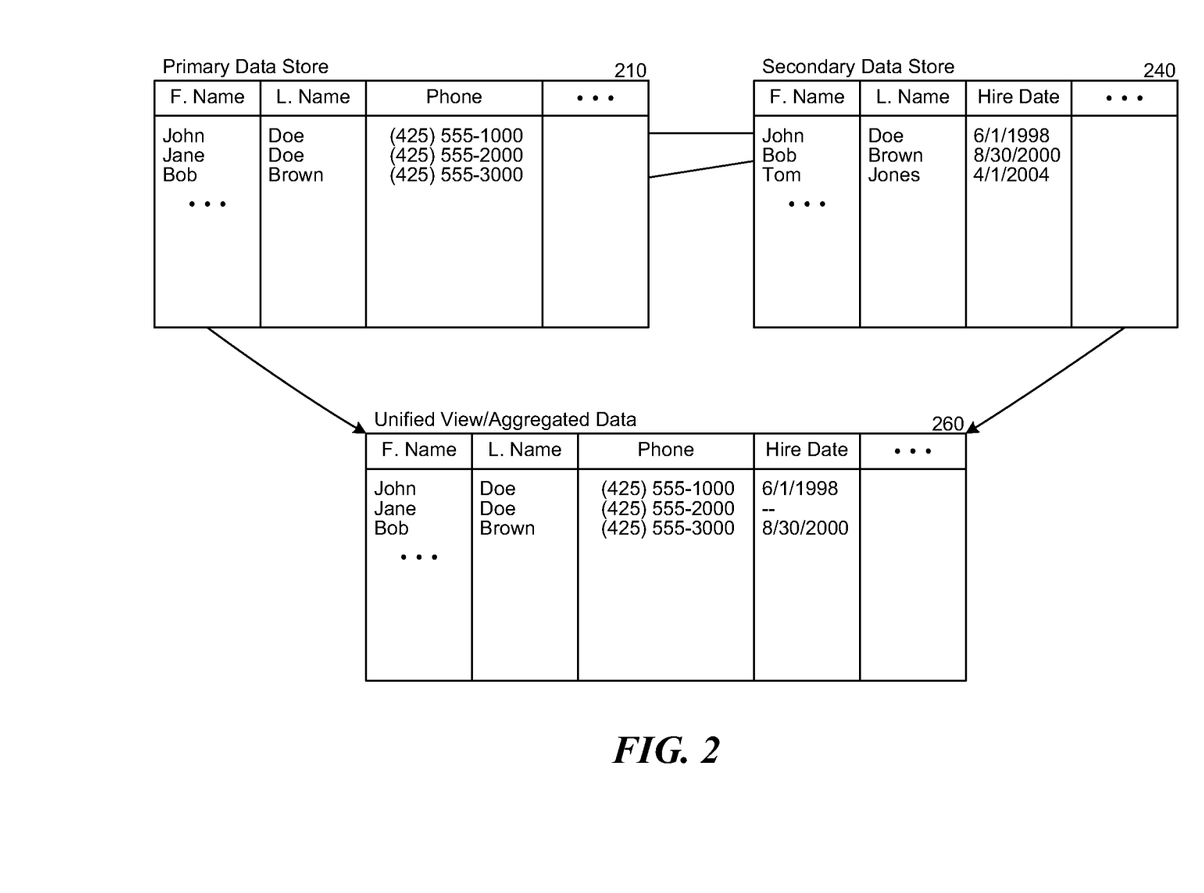
FIG. 2 is a block diagram that illustrates example data stored in a primary data store and secondary data store that the data aggregation system provides to applications in a unified view, in one embodiment.

FIG. 2 is a block diagram that illustrates example data stored in a primary data store and secondary data store that the data aggregation system provides to applications in a unified view, in one embodiment. The primary data store 210 contains three entries representing three people that are contacts of a user associated with the primary data store 210. The secondary data store 240 contains three entries representing employee records for a corporation, including the date that each employee was hired. The two data stores need not contain the same entries. For example, the user may have contacts stored in the primary data store 210 that are not employees contained in the secondary data store 240. Similarly, the secondary data store 240 may contain employees that are not contacts of the user associated with the primary data store 210.

For those entries that do match, the data aggregation system provides a unified view 260 so that it appears to applications that the data is available from a single data store. The unified view 260 contains all of the entries and fields from the primary data store 210 and fields from the secondary data store 240 when related entries are available. For example, there is no hire date in the unified view 260 for Jane Doe, because Jane Doe is not an employee with information stored in the secondary data store 240. The unified view 260 is a logical concept that illustrates how the data aggregation system presents information to applications and does not represent a new data store into which the data aggregation system copies information from the primary data store 210 and secondary data store 240. Rather, the information from each data store remains stored in the data store in which it originated, but applications can access the information as if it were in one data store.

Figure 3:
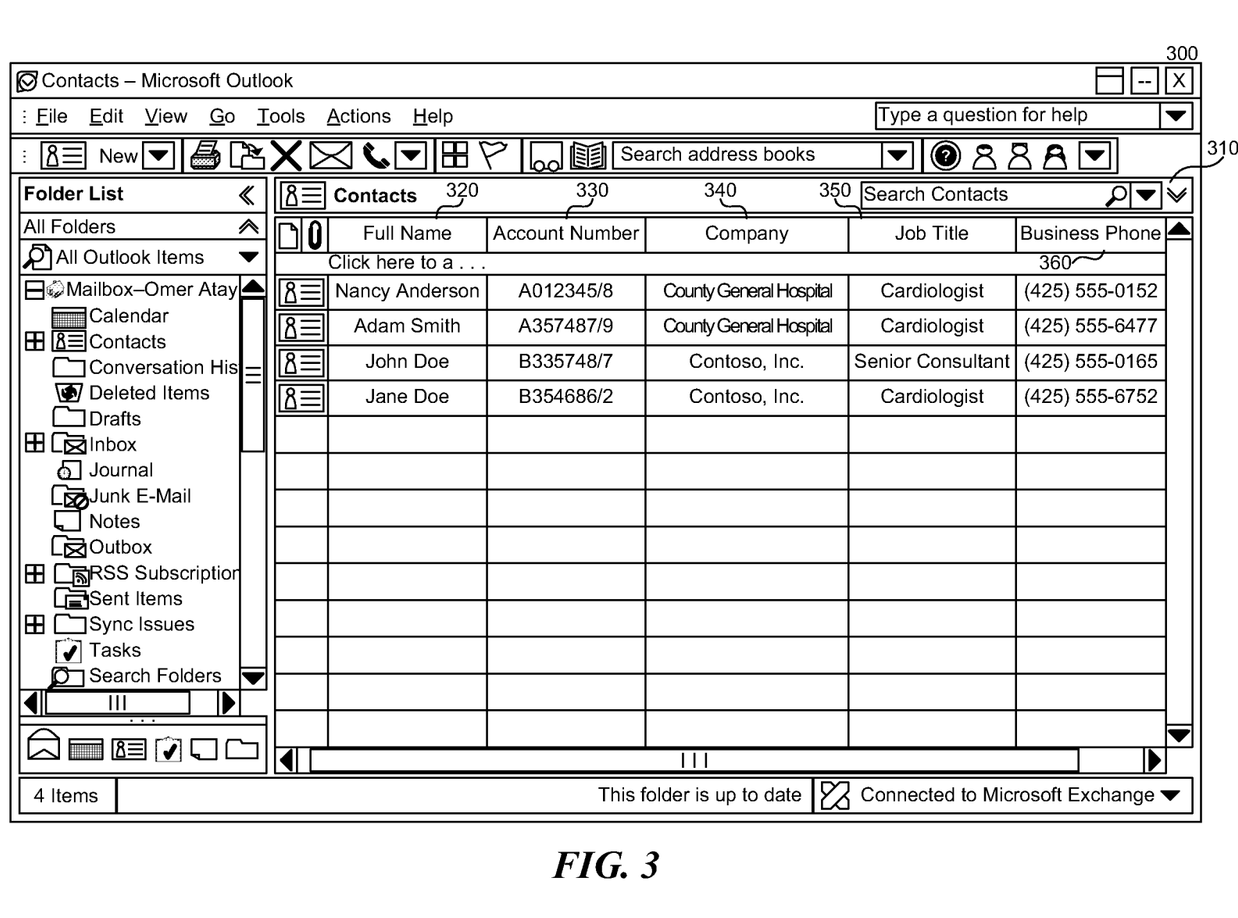
FIG. 3 is a display diagram that illustrates a graphical user interface for presenting the unified view, in one embodiment.

FIG. 3 is a display diagram that illustrates a graphical user interface for presenting the unified view, in one embodiment. The interface 300 contains a list of contacts 310. The list of contacts 310 displays fields including a full name field 320, account number field 330, company field 340, job title field 350, and business phone field 360. The full name field 320, company field 340, job title field 350, and business phone field 360 are fields that are typical in a PIM application for contacts and are stored in the PIM data store. However, the account number field 330 is not a typical PIM application field, and the data aggregation system is aggregating this data from a secondary data store. The user of the PIM application is unaware of the data store from which each field originates, and is able to see all of the fields of interest to the user for a particular contact in one view.

Figure 4:
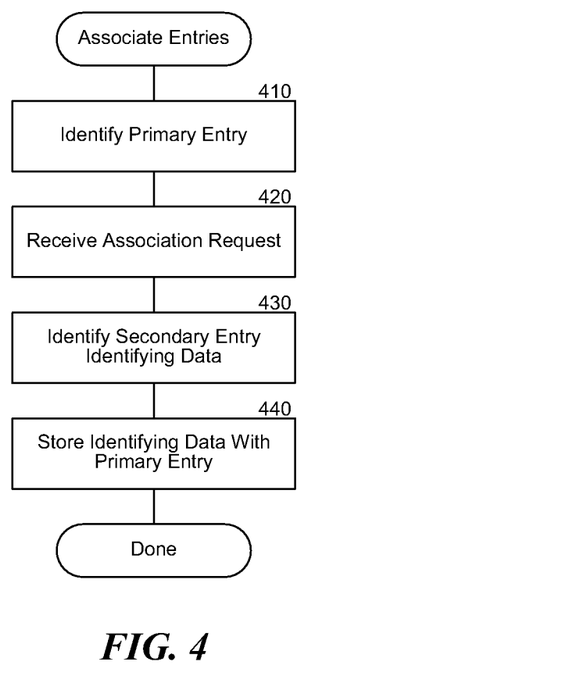
FIG. 4 is a flow diagram that illustrates the processing of the data aggregation component to associate entries in a primary data store with entries in a secondary data store, in one embodiment.

FIG. 4 is a flow diagram that illustrates the processing of the data aggregation component to associate entries in a primary data store with entries in a secondary data store, in one embodiment. In block 410, the component identifies an entry in the primary data store that contains information about an entity (e.g., a user contact, inventory item, and so on). For example, a user may select an entry from a user interface and the component identifies the entry that the user selected. In block 420, the component receives a request to associate an entry in a secondary data store with the identified entry in the primary data store. For example, the user may select a button in the user interface that indicates that the user wants to associate the entry with an entry in a secondary data store. In block 430, the component identifies information in the secondary data store that identifies the entry in the secondary data store. For example, it is common in database design to create an entry identifier for each row in a table. If such an identifier exists, then the component may select this identifier. Otherwise, the component may select other identifying information, such as a first and last name of a user, social security number, or other information. The component may prompt the user to determine which information to select to identify the entry. In block 440, the component associates the identified information with the entry in the primary data store, so that the entries from the primary and secondary data store can be viewed together without modifying the secondary data store. For example, the component may create a new field in the primary data store for storing the secondary data store entry identifier.

In some embodiments, the data aggregation system stores detailed information about the secondary data store entry in the associated primary data store entry. For example, the data aggregation system may form a packet of information that contains the currently available secondary data store fields, the values of the fields, and a version stamp (e.g., a globally unique identifier (GUID)). This information allows the data aggregation system to determine when the secondary data store has changed, and (as discussed further below) can help with updating fields that exist in both the primary and secondary data stores. The entire packet of information may be stored in a single hidden field of the primary data store that is not displayed to users. In some embodiments, the data aggregation system caches information from the secondary data store and uses the packet of information to determine when to refresh the cache by retrieving updated information from the secondary data store.

Figure 5:
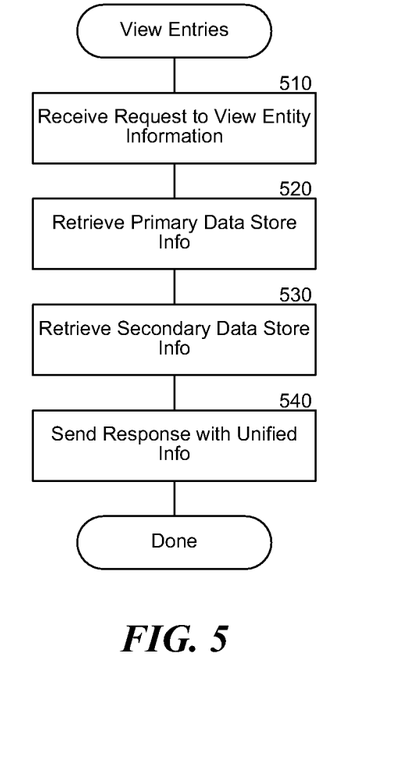
FIG. 5 is a flow diagram that illustrates the processing of the data aggregation component to view entries in a unified view, in one embodiment.

FIG. 5 is a flow diagram that illustrates the processing of the data aggregation component to view entries in a unified view, in one embodiment. In block 510, the component receives a request to display information about an entity. For example, a user may select an element in a user interface for displaying a list of the user's contacts. In block 520, the component accesses the primary data store to retrieve information about the entity. The retrieved information may contain a reference to a secondary data store that contains additional information about the entity. For example, as described with reference to FIG. 4, the component may store an entry identifier from the secondary data store along with the entry in the primary data store to associate the information in the secondary data store with the related entry in the primary data store. In block 530, the component accesses the secondary data store to retrieve additional information about the entity using the reference retrieved from the primary data store. For example, the component may use the entry identifier to retrieve a row of information from the secondary data store associated with the entity. In block 540, the component sends a response to the request that contains the information from the primary data store and the additional information from the secondary data store. In some embodiments, the response does not identify from which data store each field of information was retrieved.

Figure 6:
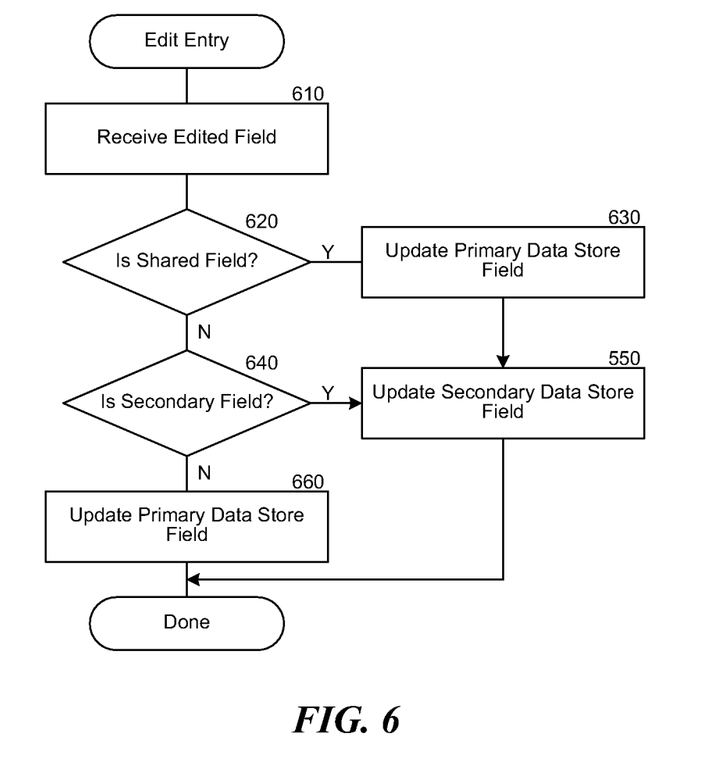
FIG. 6 is a flow diagram that illustrates the processing of the data aggregation component to edit entries, in one embodiment.

FIG. 6 is a flow diagram that illustrates the processing of the data aggregation component to edit entries, in one embodiment. In block 610, the component receives an indication of which field was edited and the new value for the field. For example, a user may select a field in a user interface and type a new value for the field. In decision block 620, if the edited field is a shared field (i.e., the same field is stored in both data stores), then the component continues at block 630, else the component continues at block 640. In some embodiments, the data aggregation system performs additional processing with respect to shared or duplicate fields (i.e., those fields having data that is stored in both the primary and secondary data stores). The data aggregation component may only provide a single instance of shared fields to applications. If the application attempts to edit the shared field, then the data aggregation component determines how to pass any updates on to the affected data stores. For example, if a contact's first name is stored as a field in both the primary data store and a secondary data store and a user edits the contact's first name, then the data aggregation component updates both the primary and secondary data stores. Sometimes a shared field may change outside of the control of the data aggregation system. For example, a user may run a line of business application that modifies a shared field in the secondary data store without updating the primary data store. In some embodiments, the data aggregation system tracks which fields are shared fields and determines whether changes have been made each time the data aggregation system runs (e.g., using the packet of information described herein). If changes have occurred, the data aggregation system may update the primary data store to reflect the changes or prompt the user to determine whether the user wants to accept the changed field.

In block 630, the component updates the edited field in the primary data store and continues at block 650. For example, if the field is "first name" then the component updates the "first name" field in the primary data store. In decision block 640, if the edited field is only stored in the secondary data store, then the component continues at block 650, else the component continues at block 660. In block 650, the component updates the field in the secondary data store and completes. For example, if the field is "first name," then after updating the field in the primary data store the component updates the field in the secondary data store. As another example, if a field "maccount number" is only stored in the secondary data store, then the component updates the field in the secondary data store. In block 660, the component updates the field in the primary data store and completes. The component reaches block 660 for those fields that are only stored in the primary data store. After block 660, these steps conclude.

In some embodiments, the data aggregation system allows the user to select a field for sorting and/or filtering that comes from a secondary data store. When sorting based on a field in the primary data store, the system sorts the information in the primary data store and then retrieves the related information from the secondary data store. However, when the user selects a field on which to perform a sort from the secondary data store, the system has two options. First, the data aggregation system may perform the sort by retrieving the values of all of the entries from the secondary data store, aggregating them with the primary store information, and then sorting the unified view. Second, the system may provide the secondary data store with a back reference to each related entry in the primary data store, and request that the secondary data store sort the entries. When the secondary store has sorted the entries, the data aggregation system retrieves the related entries in the primary data store using the back reference and presents a unified view.

From the foregoing, it will be appreciated that specific embodiments of the data aggregation system have been described herein for purposes of illustration, but that various modifications may be made without deviating from the spirit and scope of the invention. For example, although contact data has been described as primary data, the primary and secondary data stores could contain many types of related information. Accordingly, the invention is not limited except as by the appended claims.

We claim:

1. A computer-implemented method for associating information related to an entity stored in a secondary data store with information related to the entity stored in a primary data store, the method comprising:
    identifying a first entry in a primary data store that contains information related to an entity;
    receiving a request to associate a second entry in a secondary data store with the identified first entry in the primary data store;
    identifying information in the secondary data store, wherein the identified information identifies the second entry in the secondary data store; and
    associating the identified information of the second entry with the first entry in the primary data store by storing the identified information of the second entry in the primary data store, so that the first and second entries from the primary and secondary data store are viewable together without modifying the secondary data store, and without creating intermediate copies of the first and second entries in a merged data store.

2. The method of claim 1 wherein the entity is a user contact and the primary data store contains contact information associated with the user contact.

3. The method of claim 1 wherein the primary data store is a data file associated with a personal information management application.

4. The method of claim 1 wherein the secondary data store is a database containing line of business data.

5. The method of claim 1 further comprising receiving a request to view the first entry in the primary data store and retrieving the information related to the first entry in the primary data store and the information related to the second entry in the secondary data store, wherein the information from the secondary data store is retrieved using the identified information stored in the primary data store.

6. The method of claim 1 further comprising, when information in the secondary data store is updated, the primary data store is not updated.

7. The method of claim 1 further comprising associating third entry in an additional data store with the first entry in the primary data store.

8. The method of claim 1 wherein the primary data store and secondary data store contain at least one field of duplicate information related to the entity.

9. The method of claim 1 wherein identified information comprises a packet of information including a list of fields, a list of values, and a version stamp.

10. A computer system for aggregating information stored in multiple data stores in a unified view, the system comprising:
    a processor and memory configured to execute software instructions embodied within the following components;
    a primary data store configured to store information related to one or more entities as first entries;
    a secondary data store configured to store additional information related to at least one of the one or more entities as second entries, wherein the primary data store includes one or more references to one or more of the second entries containing the additional information in the secondary data store; and
    an aggregation component configured to provide a unified view of the information stored in the primary data store and the additional information stored in the secondary data store using the references to one or more of the second entries stored in the primary data store, wherein the unified view provides the appearance to a consumer of the unified view that the information is stored in a single data store without creating intermediate copies of the first and second entries in a merged data store.

11. The system of claim 10 further comprising a view component configured to display a unified entry containing information related to an entity, wherein some of the information is retrieved from the primary data store and some of the information is retrieved from the secondary data store.

12. The system of claim 10 further comprising an object model component configured to provide an application programming interface for accessing the unified view of information related to the one or more entities provided by the aggregation component.

13. The system of claim 10 further comprising a sorting component configured to sort entries in the unified view.

14. The system of claim 10 wherein the primary data store is a PIM application database and the secondary data store is a line of business database.

15. A tangible computer-readable storage medium encoded with instructions for controlling a computer system to display information from multiple data stores in a unified view, by a method comprising:
    receiving a request to display information related to an entity;
    accessing a primary data store to retrieve a first entry of information related to the entity, wherein the primary data store also contains a reference to a second entry in a secondary data store that contains additional information related to the entity;
    accessing the secondary data store to retrieve additional information related to the entity using the reference to the second entry retrieved from the primary data store, wherein the primary data store and secondary data store are accessed directly by a data consumer without creating intermediate copies of the first and second entries in a merged data store; and
    displaying a user interface that contains the information from the first entry of the primary data store and the additional information from the second entry of the secondary data store, wherein the user interface does not identify from which one of the primary or secondary data store the information and the additional information is retrieved.

16. The tangible computer-readable medium of claim 15 further comprising receiving a request to edit the information, determining which one of the primary or secondary data store the information was retrieved from, and updating the determined one of the primary or secondary data store.

17. The tangible computer-readable medium of claim 15 further comprising receiving a request to edit the information, determining that the edited information is stored in both the primary and secondary data stores, and updating both the primary and secondary data stores.

18. The tangible computer-readable medium of claim 15 wherein the user interface has a table format and the information and the additional information from the primary and secondary data stores is displayed in columns in the table.

19. The tangible computer-readable medium of claim 15 further comprising:

receiving a request to sort information related to multiple entities based on the additional information retrieved from the secondary data store;

sorting the information related to each of the multiple entities; and sending a response to the request to sort information related to the multiple entities that contains the sorted information.

20. The tangible computer-readable medium of claim 15 further comprising:

receiving a request to sort information related to multiple entities based on the additional information retrieved from the secondary data store;

sending a request to the secondary data store to sort the additional information at the secondary data store;

receiving the sorted information from the secondary data store;

aggregating the sorted information with the information retrieved from the primary data store; and sending a response to the request to sort information related to the multiple entities that contains the aggregated information.

\* \* \* \* \*